UNITED STATES PATENT OFFICE.

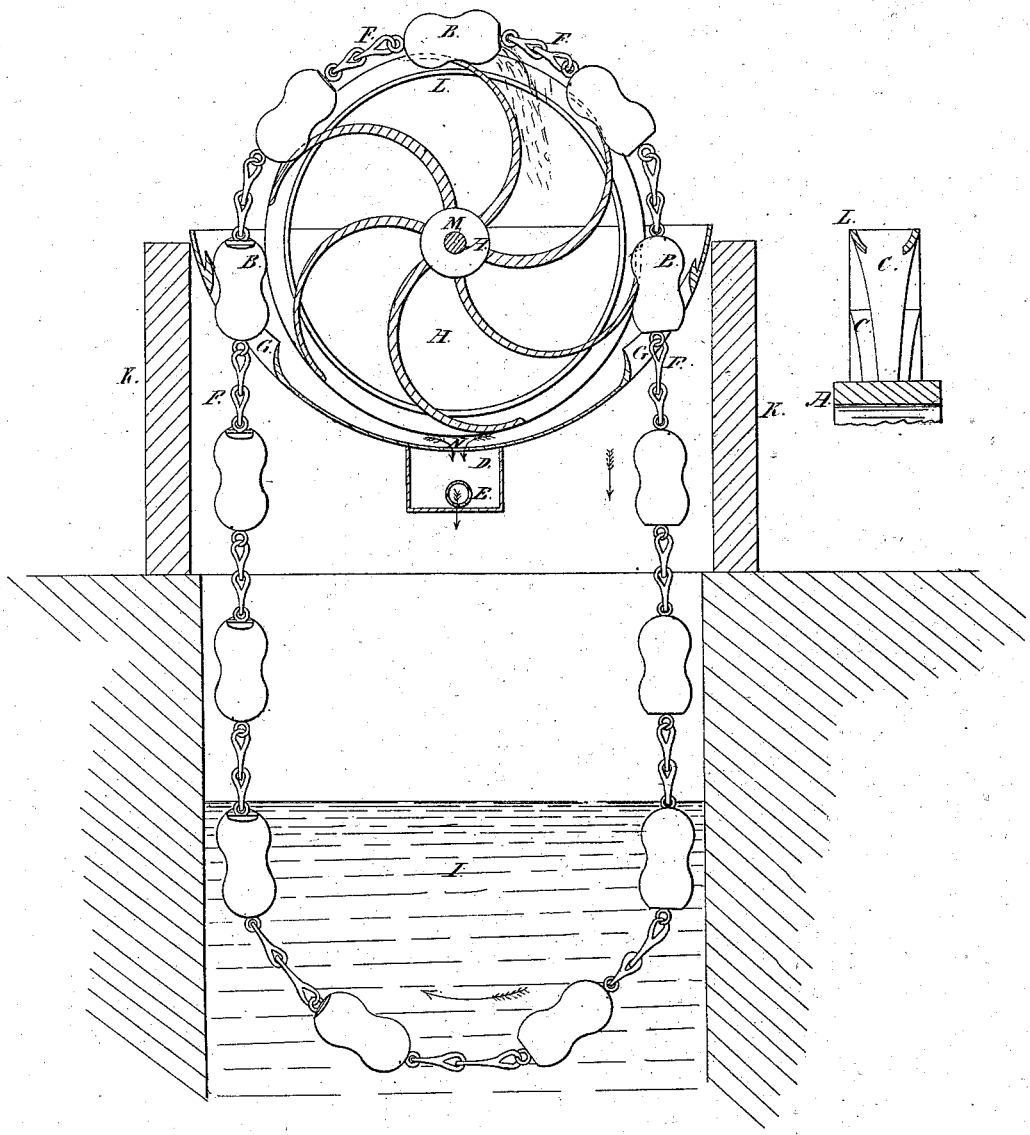

EMMET R. AUSTIN, OF NORWALK, CONNECTICUT.

IMPROVEMENT IN WATER-ELEVATORS.

Specification forming part of Letters Patent No. 58,368, dated October 2, 1866.

*To all whom it may concern:*

Be it known that I, EMMET R. AUSTIN, of Norwalk, in the county of Fairfield and State of Connecticut, have invented certain new and useful Improvements in Water-Elevators; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use the invention, I will proceed to describe it.

My invention consists in a novel construction of the wheel used for raising the buckets; also, in a bucket of peculiar make, and in a trough with orifices having raised flanges around them, through which the buckets pass, whereby I am enabled to dispense entirely with the tubing ordinarily used in chain-pumps, so called.

Figure 1 is a longitudinal vertical section of a well and my improved apparatus ready for use, the buckets being shown in elevation. Fig. 2 is a transverse vertical section of a portion of the wheel.

I construct a wheel having a hub, A, with curved arms C and a rim, L, that is concave on its periphery, and which is formed in two parts, with a space between the two parts, as shown in section in Fig. 2. The arms C are made flat transversely of the wheel, and at their outer ends, where they join the rim L, they are as wide as the rim, narrowing toward the hub A. The wheel thus constructed is provided with a shaft and crank, in the usual manner, and mounted on a curb or box, K, over the well, as in ordinary cases.

Within the box or curb K is located a trough, H, having a rounded or concave bottom, as shown in Fig. 1. A hole large enough for the passage of the buckets is made through the bottom of the trough H, on a line with the periphery of the wheel, at each side thereof, as shown in Fig. 1, and around each of these holes a raised rim or flange, G, projects upward into the trough, for the purpose of preventing the water in the trough, or that may be delivered there by the buckets, from escaping through these holes back into the well. Another hole is also made at the bottom of the trough for the escape of the water, as indicated by the arrows. A spout, D E, is connected with this hole, and is arranged to deliver the water at any desired point outside of the curb.

B represents the buckets, which are made somewhat in the form of an hour-glass, as shown, the diameter of these buckets being such that they will rest securely in the concavity of the rim L of the wheel. A series of these buckets are united with chains or links F, as shown, and mounted on the wheel, from whence they extend down into the water in the well. The buckets should be sufficiently numerous to have one lie between each arm of the wheel, as shown.

By the peculiar form of these buckets it will be observed that they may either lie in the rim between the arm C, or they may lie with their center opposite and over the end of the arms C, the end of the arm in that case fitting in the hollow around the center of the bucket.

A small hole is formed in the bottom of each of the buckets, so that when standing any water that may chance to be in them will escape, and thus insure a supply of fresh water from the well when the buckets are raised.

It will be observed that with the parts thus constructed no tubing is required, as in the ordinary chain-pump; and by these means I not only save expense, but much trouble and annoyance, as it is well known that the tubing soon becomes so worn by the chain as to permit the escape of the water past the buckets, and thus become nearly useless, and necessitating the removal of the apparatus and the supplying of new tubes.

As the buckets assume a horizontal position on the wheel, the water runs out and passes through the space between the two parts of the rim L, the wide arms C serving to guide the water toward the center of the trough, and the flanges G serving to prevent it from escaping around the buckets back into the well.

By these means I am enabled to produce a very efficient and durable apparatus for raising water.

Having thus described my invention, what I claim is—

1. The wheel having the concave rim composed of two parts, with an open space between them, and the arms C, constructed as set forth.

2. In combination with the wheel constructed as described, the buckets B, as shown and described.

EMMET R. AUSTIN.

Witnesses:
WM. VINE,
JOSEPH F. FOOTE.